Sept. 8, 1959  R. A. BUCHANAN  2,903,685
SEQUENCE INDICATOR
Filed July 29, 1957  4 Sheets-Sheet 2
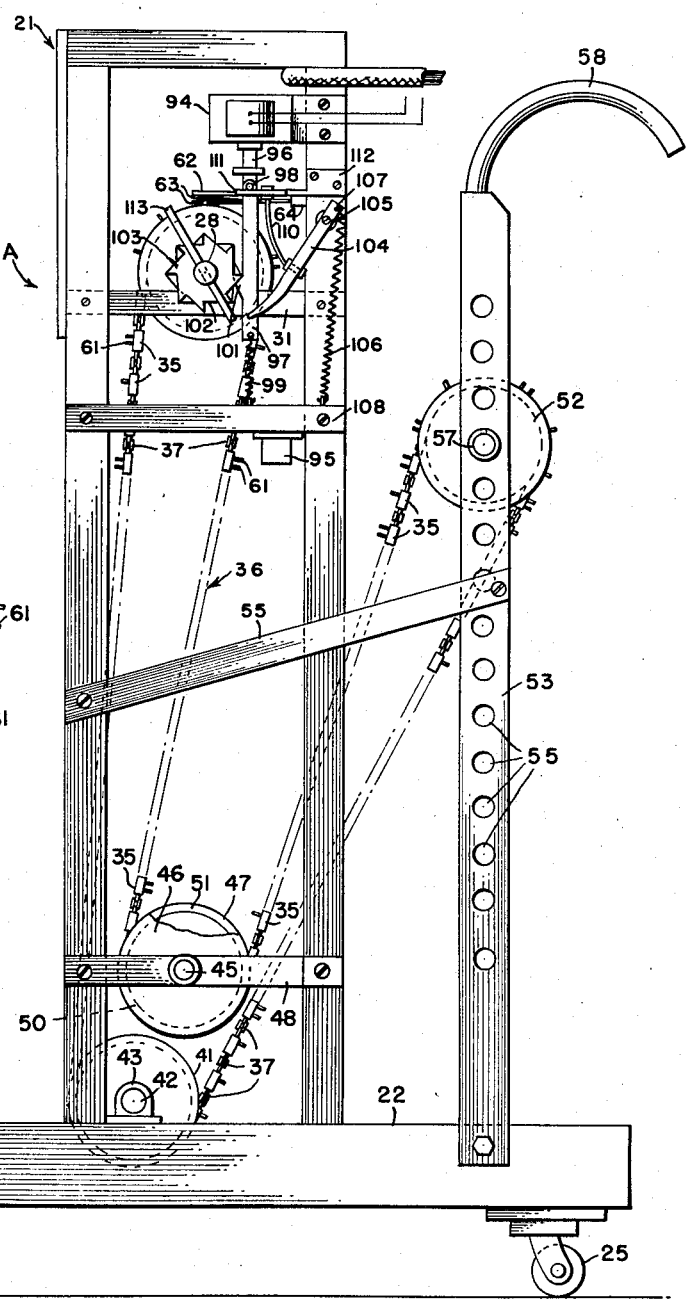
FIG. 2.
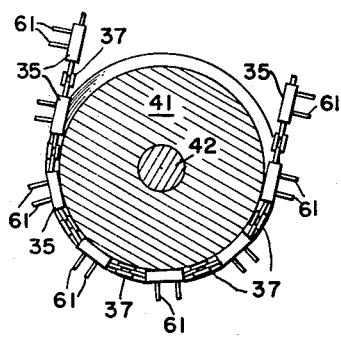
FIG. 4.
FIG. 6.
INVENTOR.
ROBERT A BUCHANAN
BY
Albert J. Kramer
ATTORNEY Sept. 8, 1959  R. A. BUCHANAN  2,903,685
SEQUENCE INDICATOR
Filed July 29, 1957  4 Sheets-Sheet 3

INVENTOR.
ROBERT A. BUCHANAN
BY
Albert J. Kramer
ATTORNEY

Sept. 8, 1959　　　R. A. BUCHANAN　　　2,903,685
SEQUENCE INDICATOR

Filed July 29, 1957　　　　　　　　　　4 Sheets-Sheet 4

INVENTOR
ROBERT A. BUCHANAN

BY Albert J. Kramer
ATTORNEY

United States Patent Office 2,903,685
Patented Sept. 8, 1959

2,903,685
SEQUENCE INDICATOR
Robert A. Buchanan, Wallace, N.C.
Application July 29, 1957, Serial No. 674,783
10 Claims. (Cl. 340—334)

This invention relates to sequence indicating devices or prompters and it has a special application to the art of weaving, although it may also be applied to other fields where sequence indicating devices are used or may have application.

In threading heddles, for example, the sequence in accordance with the pattern desired is customarily set down in a schedule of heddle numbers on a sheet of graph paper. The heddles are then threaded from the directions given by the schedule. In some patterns, there may be as many as 200 or more different ways in which to draw thread, depending upon the pattern desired in the final cloth before the order is repeated. Thus the person doing the work, as one thread is drawn, must pay close attention to the schedule to find the next heddle number and carefully keep the place on the schedule as the work advances. This is not only tiring, but it is also inefficient and conducive to the making of mistakes.

An object of this invention is the provision of a device which reduces the changes of human error in threading heddles and increases the efficiency and speed by which the heddles may be threaded.

Another object of the invention is the provision of an apparatus which obviates the need of any written schedules or instructions relative to the order of heddle numbers and which does not require the heddle threader to pay close attention to or keep a constant check on any data.

A further object of the invention is the provision of a device for progressively indicating heddle numbers or other data by the selective lighting of a series of numbered electric lamps, the numbers of the lamps corresponding to the heddle numbers or data to be designated.

A still further object of the invention is the provision of such a device in which the lighting of the electric lamps is selectively controlled by a switch apparatus having novel features, including an endless chain adapted to removably hold members for actuating electrical switches.

These and other objects, advantages and features of the invention will appear more fully from the following description, considered together with the accompanying drawing.

In the drawing:

Fig. 2 is an elevational view of one side of the same unit.

Fig. 3 is an enlarged view of the drive and control parts of Fig. 1, broken away from the remaining portion.

Fig. 4 is a cross sectional view along the line 4—4 of Fig. 1.

Fig. 6 is a view of the driving spool apart from the device as a whole.

Referring with more particularity to the drawing in which like numerals designate like parts, the embodiment illustrated comprises a switching unit A and a signaling or light unit B electrically connected to each other by a cable of wires C.

Figure 1:
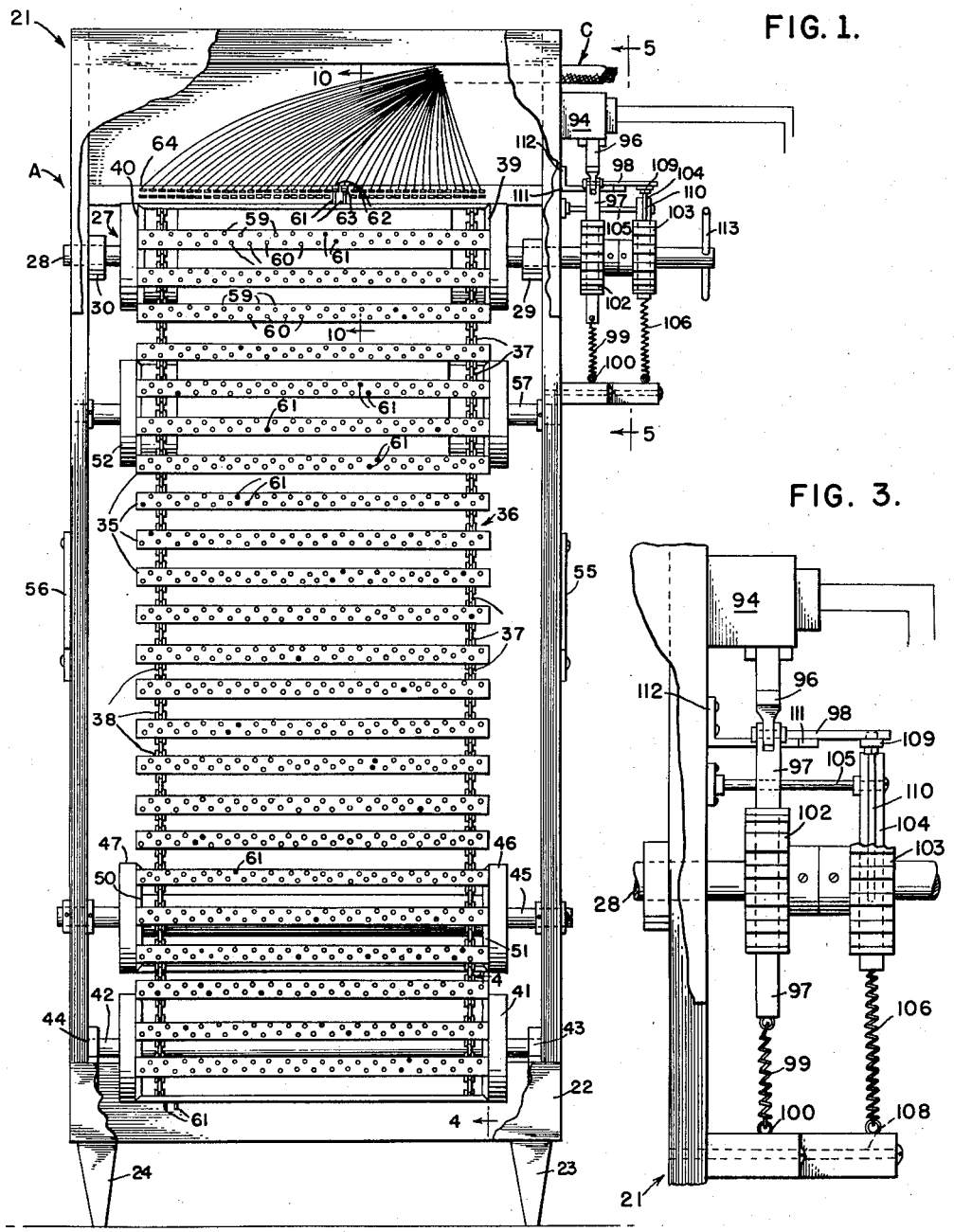
Fig. 1 is a front elevational view of the switching unit of an embodiment of the invention, partly broken away.
Figure 7:
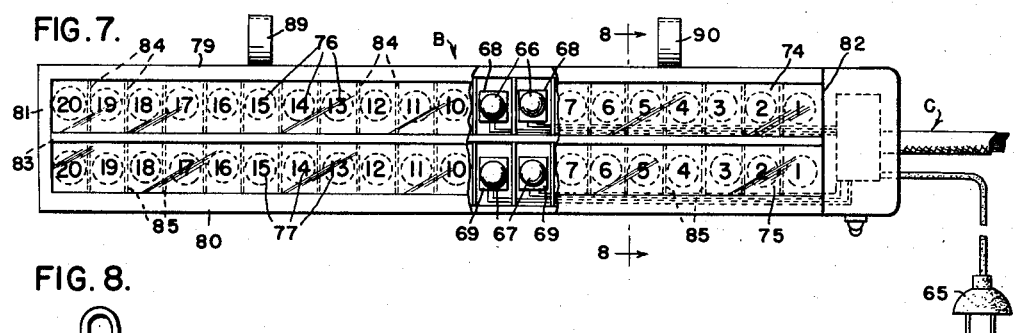
Fig. 7 is a top plan view of the second part or light unit of the embodiment, partly broken away.
Figure 8:
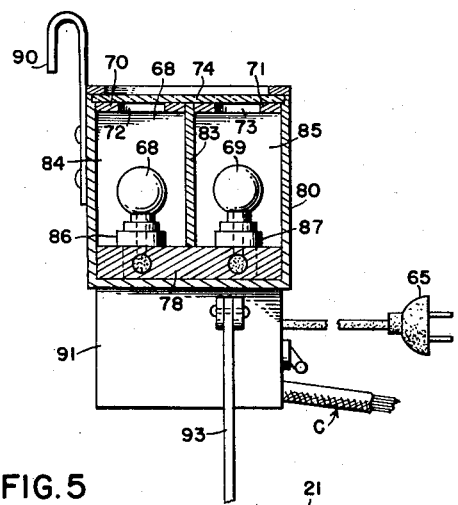
Fig. 8 is a section along the line 8—8 of Fig. 7.
Figure 5:
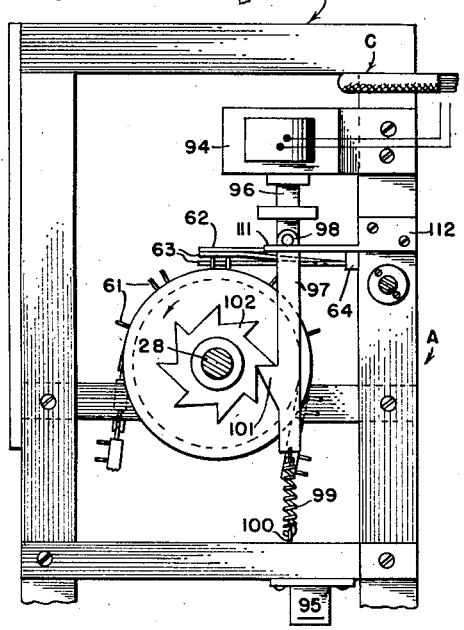
Fig. 5 is a section along the line 5—5 of Fig. 1.
Figure 9:
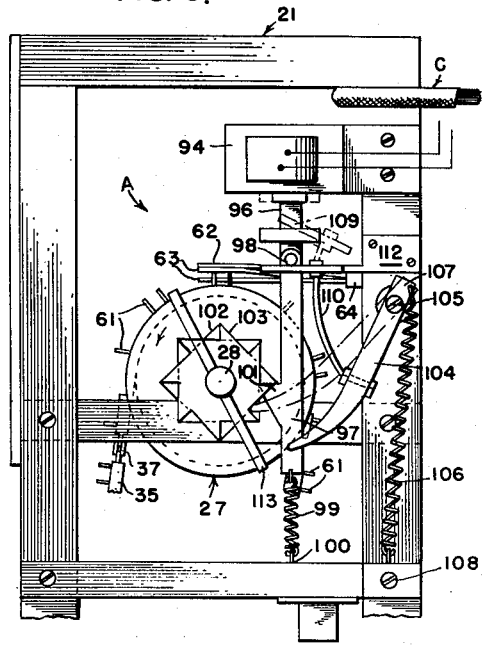
Fig. 9 is an enlarged view of the upper portion of Fig. 2 showing by full and broken lines different positions of certain parts to illustrate the action thereof.
Figure 10:
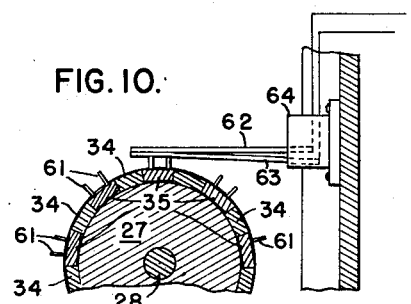
Fig. 10 is a section along the line 10—10 of Fig. 1.
Figures 11, 12:
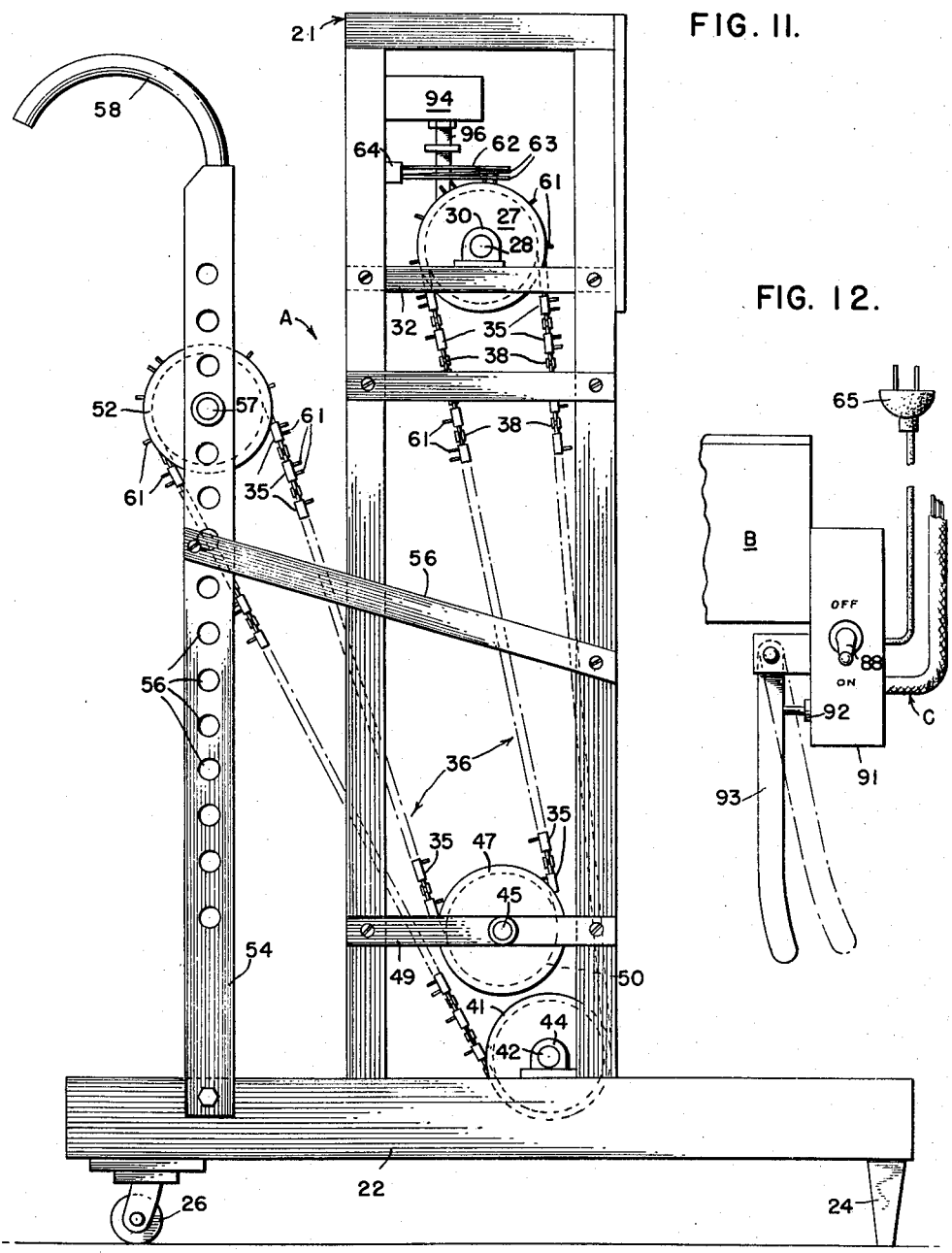
Fig. 11 is an elevational view of the side of the switching unit opposite the one shown in Fig. 2.
Fig. 12 is a front elevational view of a fragmentary part at the right end of the light unit.

The switching unit A comprises an open frame structure 21 mounted on a base 22 having a pair of legs 23 and 24 at the front and a pair of rollers or casters 25 and 26 at the rear.

At the top of the frame 21, there is disposed an elongated roller or spool 27 having an axial shaft 28 fixed to rotate therewith. The ends of the shaft 28 are rotatably mounted in bearings 29 and 30 carried by horizontal frame members 31 and 32 on either side of the frame structure. The spool 27 comprises longitudinal peripheral grooves 33 formed by spaced cleats 34 which are designed to mesh with the slats 35 of an endless chain 36. The chain 36 is formed by a series of right and left link sections 37 and 38 connecting consecutive slats 35 in parallel spaced relation, substantially as shown, the distance between consecutive slats constituting an interval as a term of reference herein. The spool 27 has its flanged ends 39 and 40 tapered on the inner sides as shown, and the ends of the slats 35 are correspondingly undercut to fit the tapered portions.

A plain spool 41, similar in size to the spool 27 has a shaft 42 fixed thereto and it is rotatably mounted at the bottom of the frame on the base 22 in bearings 43 and 44. Above the spool 41, a shaft 45 carrying circular end plates 46 and 47 secured thereto are rotatably mounted on horizontal frame sections 48 and 49. The plates 46 and 47 are spaced apart to accommodate the slats 35 and they are provided on the inside with rollers 50 and 51 to contact and support the ends of the slats 35.

Another similarly cleated spool 52, like the spool 27 is disposed between a pair of rear uprights 53 and 54 having each a row of corresponding aligned apertures 55 and 56 in which the ends of the shaft 57 of the spool 52 are selectively disposed.

The uprights 53 and 54 are rigidly secured to the base member 22 and also to frame structure 21 by braces 55 and 56. The upper ends are provided with arcuate handles 57 and 58, for use in moving the device from place to place on the rollers 25 and 26.

The slats 35 are each provided with two rows of holes 59 and 60, the holes of one row being staggered in relation to the other, as shown. These holes are adapted to receive pegs 61.

Each hole of the rows 59 and 60 is in vertical alignment with a pair of horizontal electrical switch arms or fingers 62 and 63, one overlying the other, at the top of the frame. These fingers are resilient and arranged in rows as shown; they extend cantileverwise from a transverse support bracket 64 to which they are secured over the top of the spool 27. The lowermost row of fingers 63 is in the path of travel of the pegs 61 that are placed in the apertures of the slats to a degree sufficient to move these lower fingers upwardly in contact with the upper fingers 62 as shown. Each corresponding pair of the upper and lower fingers constitutes a switch which is electrically connected to a source of electric current, such as an electrical wall receptacle (not shown) through a plug 65 and through wires of the cable C to one of the electric lamps 66 and 67 of the unit B, hereinafter more fully described. Hence, these lamps are lit by the pegs closing their corresponding switch contact arms as the chain moves over the spool 27.

The electric lamps 66 and 67 are arranged in two rows of compartments 68 and 69, respectively, the upper walls 70 and 71 of these compartments having each an opening 72 and 73, respectively, covered by a strip of glass 74, 75 or other transparent or translucent material. These glass strips each carry numbers 76, 77, each number of the row identifying its corresponding lamp. One row of numbers is of a color contrasting to that of the other, such as red and green.

The lamp compartments of the unit B comprises also an elongated base member 78, side walls 79, 80 and end walls 81 and 82. The space between these walls are subdivided into the compartments by a central longitudinal partition 83 and a plurality of upper and lower transverse partitions 84 and 85, respectively.

Sockets 86 and 87 for the lamps are mounted on the base member 72.

Each lamp is connected in series with one of the switches formed by a corresponding pair of fingers 62 and 63. These individual lamp circuits are connected together in parallel with the source of electrical energy and a master switch 88 is disposed in the power line to turn the unit on and off, as desired.

Hangers in the form of hooks 89 and 90 are secured to the unit B to removably support it on a ledge, table, bar or other suitable location adjacent and convenient to the operator, preferably just above knee level.

A bracket 91 at the bottom of the unit B carries the switch 88 and another switch 92 with a pendulant switch arm 93 therefor adapted to be moved by the knee of the operator. This switch is electrically connected to operate a solenoid 94 deriving electrical energy through a transformer 95 from the same source of supply.

The solenoid 94 has a vertically reciprocable motor arm 96, a lower segment 97 of which is pivoted thereto by a horizontal pin 98. The segment and arm are biased to their lowermost positions by a coil spring 99 under tension, one end of the spring being attached to the segment 97 and the other end to a convenient point 100 of the frame. Excitation of the solenoid causes the arm and segment to move upward against the force of the biasing spring 99.

The segment 97 carries a pawl or tooth 101 which is set to engage a ratchet wheel 102 fixed to the shaft 28. The teeth of this ratchet wheel and the spacing thereof are fixed in relation to the pawl 101 and the cleats 34 so that the wheel is rotated counterclockwise, as viewed in Fig. 2, one interval upon each upward stroke of the arm 96.

A second ratchet wheel 103 is also fixed to the same shaft 28, adjacent the ratchet wheel 102, the notches running in the opposite direction to engage the end of a stop pawl 104 pivotally carried on a bar 105 secured to and projecting from the frame 21. The stop pawl 104 is urged to rotate counterclockwise by a coil spring 106 connected between the outer arm 107 of the pawl and a point 108 of the frame. This tendency, however, is normally overcome by the force of the spring 99 acting downwardly through the pin 98 projecting outwardly over a bar 109 secured to the pawl 104 by a curved shank 110. The lowermost position of the pin 98 is defined by a horizontal stop arm 111 forming a part of a bracket 112 connected to the frame structure.

Thus as the solenoid arm 96 moves upward carrying the segment 97, the tooth 101 engages a notch of the ratchet wheel 102 and rotates it. In the meantime, the pin 98 releases its pressure from the bar 109, permitting the spring 106 to rotate the pawl 104 counterclockwise, whereupon the end of the pawl falls in alignment with a tooth of the ratchet wheel 103 and limits rotation of the shaft 28 to just one interval. This is sufficient to bring into action the slat pegs 61 of the next slat of the chain 36 to close the corresponding switch or switches and energize the corresponding signal lights in the unit B.

This action is repeated each time the knee switch lever arm 93 is actuated. Should the operator accidentally trip the knee switch prematurely, the chain 36 may be turned back one or more intervals to its proper sequential position by simply moving the lower end of the segment 97 outward to disengage the tooth 101 from its ratchet wheel 102 and turning the shaft 28 by means of a finger bar 113 provided at the end of the shaft, as shown, or by any other suitable crank means.

Should a shorter chain be necessary in any particular case, it may be provided by removing some of the slats and links as may be necessary or desired and repositioning the ends of the shaft 57 in a lower set of shaft holes 55 and 56 in the uprights 53 and 54. Conversely, the chain may be lengthened by adding additional slats and links and relocating the ends of the shaft 57 in an upper set of holes of these uprights. If necessary, extensions may be provided for these uprights.

Having thus described my invention, I claim:

1. A sequence indicator comprising a light signal unit having a plurality of individually numbered electric lights, a sequential switching unit for selectively actuating said lights in accordance with a predetermined order, said switching unit being electrically connected to said light unit, said switching unit including switches, one for each light of the light unit, an endless chain, a plurality of actuating elements for said switches attached at intervals to the chain, means for driving the chain one interval at a time, said means comprising an electrical switch supported on the light unit and a switch arm depending therefrom for actuation by a person while viewing the light unit, and means for supporting the chain adjacent the switches so as to actuate said switches.

2. A sequence indicator as defined by claim 1 in which the chain comprises a plurality of slats linked together and the switch actuating elements comprise pegs carried by said slats.

3. A sequence indicator as defined by claim 2 in which the slats contain apertures for supporting said pegs.

4. A sequence indicator as defined by claim 3 in which the chain is supported on spools, one of the spools being for driving the chain, said chain driving spool having a plurality of cleats circumferentially spaced to mesh with the slats of the chain.

5. A sequence indicator as defined by claim 4, a shaft rotatable with said chain driving spool, said driving means comprising a ratchet wheel connected to the shaft, a ratchet arm engaging said ratchet wheel and means for reciprocating said ratchet arm relative to the wheel.

6. A sequence indicator as defined by claim 4, a shaft rotatable with said chain driving spool, an escapement mechanism connected to the shaft and means for actuating said mechanism simultaneously with the driving of said chain.

7. A sequence indicator as defined by claim 4, a shaft rotatable with said chain driving spool, said driving means comprising a ratchet wheel connected to the shaft, a ratchet arm engaging said ratchet wheel and an electrical solenoid for moving said ratchet arm relative to the wheel.

8. A sequence indicator comprising a light signaling unit having a plurality of individually numbered electric lights, a sequence switching unit for selectively actuating said lights in accordance with a predetemined order, said switching unit being electrically connected to said light signaling unit, said switching unit including switches, one for each light of the light unit, an endless chain, a plurality of actuating elements for said switches attached at intervals to the chain, means for driving the chain one interval at a time and for holding it against movement between consecutive intervals of driving, said means including an electrical switch supported on the light unit and a switch arm depending therefrom for actuation by a person while viewing the light unit, and means for supporting the chain adjacent the switches so as to actuate said switches.

9. A sequence indicator comprising a frame, said frame including uprights, horizontal rollers rotatably mounted on the frame between said uprights at different elevations, an endless chain of horizontal slats carried by said rollers, cleats secured to and carried by the uppermost roller for meshing with the slats of the chain, a ratchet wheel mounted for rotation with said uppermost roller, a solenoid mounted on the frame, said solenoid having an armature, a ratchet arm connected to the armature so as to actuate said ratchet wheel when the armature is actuated, said slats having rows of apertures, pins adapted to be selectively disposed in said apertures, a plurality of electrical switches on the frame having movable switch contact members in the path of said pins when disposed in said apertures during movement of the chain by the uppermost roller, an electrical lamp connected to each of said switches, means for supporting said lamps as a group apart from and independently of said frame, said means comprising an elongated portable receptacle having rows of compartments, one compartment for each lamp, sequence marks carried by the receptacle for identifying each lamp in a row and distinguishing it from the other lamps in the row, a switch secured to and carried by said receptacle, said switch being electrically connected to said solenoid, and an actuator arm for the latter switch mounted on the receptacle so as to be operable by a person while the person is viewing said rows of lamps.

10. A sequence indicator comprising a portable base, a frame supported on said base, said frame comprising uprights, rollers rotatably mounted on the frame between said uprights, including a top roller, bottom rollers, and a roller intermediate of said top and bottom rollers, means for supporting said intermediate rollers in different vertical positions between said uprights, an endless chain of horizontal slats carried by said rollers, cleats carried by said upper roller for meshing with the slats of the chain, a ratchet wheel mounted for rotation with said upper roller, a solenoid mounted on the frame, said solenoid having a reciprocating armature, a ratchet arm connected to the armature for actuating said ratchet wheel when the armature is actuated, said slats each having rows of apertures, pins adapted to be selectively disposed in said apertures, a plurality of electrical switches on the frame having movable switch contact members in the path of pins disposed in said apertures during movement of the chain by the top roller, an electrical lamp electrically connected to each of said switches, means for supporting said lamps as a group apart from and independently of said frame, said means comprising an elongated portable receptacle having rows of compartments corresponding to the said rows of apertures, one compartment for each lamp, sequence marks carried by the receptacle for identifying and distinguishing each lamp in a row from the other lamps in the row, a switch secured to and carried by said receptacle and electrically connected to said solenoid, said switch having a switch arm for actuating it by a person while viewing said rows of lamps.

References Cited in the file of this patent

UNITED STATES PATENTS

| | | |
|---|---|---|
| 450,615 | Delany | Apr. 21, 1891 |
| 696,169 | Gleizes | Mar. 25, 1902 |
| 1,888,599 | Harris | Nov. 22, 1932 |
| 2,404,074 | Keen | July 16, 1946 |
| 2,679,398 | Jameson | May 25, 1954 |